Patented Aug. 14, 1945

2,382,838

UNITED STATES PATENT OFFICE 2,382,838

PROCESS OF MAKING POLYETHYLENE AMINE DERIVATIVES OF FOSSIL RESINS AND PRODUCT PRODUCED THEREBY

Karl H. Weber, Lancaster, Pa., assignor to Armstrong Cork Company, Lancaster, Pa., a corporation of Pennsylvania No Drawing. Application May 29, 1943, Serial No. 489,068

4 Claims. (Cl. 260—102)

This invention relates to a process of making derivatives of fossil resins and more particularly to a process of reacting copal resins in normal condition with a material selected from the group consisting of polyethylene amines containing at least two ethylene groups and amino alcohols having a boiling point of at least 175° C. By "normal condition" of copal resin, I mean copal resin that has not been depolymerized or fused prior to reaction.

The chief object of this invention is to provide a process of making derivatives of fossil resins. An object of my invention is to provide a process of forming amides or amido-esters of copal resin which will be inexpensive and easily conducted. A further object is to provide a new amide of copal resin. A still further object is to provide a new amido ester of copal resin. Other objects of my invention will be readily perceived from the following description.

This invention relates to a process of forming derivatives of fossil resins, such as Zanzibar copal, Madagascar copal, Mozambique copal, Congo copal, Manila copal, and kauri resin, which comprises reacting directly the fossil resin in normal condition with a material selected from the group consisting of polyethylene amines containing at least two ethylene groups and amino alcohols having a boiling point of at least 175° C. By "polyethylene amines containing at least two ethylene groups" I mean polyethylene amines above ethylene diamine, such as diethylene triamine or triethylene tetramine. Suitable amino alcohols for use in my process are 2-amino-2-ethyl-1,3-propandiol and 2-amino-1-butanol.

This invention further relates to a process for the manufacture of amides of fossil resins in which a fossil resin in normal condition is heated with a polyethylene amine containing at least two ethlene groups at a temperature sufficiently great to cause amide formation. This invention further relates to a process of forming amido esters of fossil resins in which a fossil resin in normal condition is heated with an amino alcohol having a boling point of at least 175° C. at a temperature sufficiently great to cause esterification and amide formation.

It is essential in my invention that such polyethylene amines and amino alcohols possess a boiling point so high as to prevent any material distillation of unreacted polyethylene amine or amino alcohol during the process of reaction. This direct reaction between fossil resins in normal condition and polyethylene amines or amino alcohols having a boiling point of at least 175° C. permits the attainment of amides and amido esters of fossil resins in a simple, convenient and inexpensive procedure and enables the production of amides and amido esters of fossil resins heretofore unknown.

In order to more fully describe my invention, the following illustrative examples are given:

Example 1

Congo copal in an amount of 100 grams is placed in a flask and heated with 34 grams of diethylene triamine under reflux using an air condenser. Such materials are reacted for 5 hours and during such period the temperature gradually increases to 305° C. The resin produced is hard, brittle, and dark in color. It is produced in a yield of approximately 73% and has an acid number of 14. The resin appears to be satisfactory for use as a varnish resin.

Example 2

100 grams of Congo copal is placed in a flask and heated with 44 grams of triethylene tetramine under reflux using an air condenser. The material is heated for 4 hours and during such period the temperature gradually increases to approximately 300° C. The resulting resin is dark, hard and brittle and is produced in a yield of approximately 74%. It possesses an acid number of 8, and is satisfactory for use as a varnish resin.

Example 3

Congo copal in an amount of 100 grams is placed in a flask and heated with 26 grams of 2-amino-2-ethyl-1, 3-propandiol under reflux using an air condenser. During one hour's heating the material gradually raises to a temperature of 310° C. The resulting resin is dark and brittle. It is produced in a yield of approximately 69% and possesses an acid number of 2.5. It appears satisfactory for use as a varnish resin.

Example 4

Congo copal in an amount of 100 grams is placed in a flask and heated with 29 grams of 2-amino-1-butanol under reflux using an air condenser. The material is heated for 3 hours and at the end of such period the temperature is approximately 332° C. The resulting resin is produced in a yield of approximately 74%. It possesses an acid number of 2 and is brittle and dark in color. It appears satisfactory for use as a varnish resin.

I have found that fossil resins may be reacted directly by heating the resin in normal condition with a polyethylene amine containing at least two ethylene groups or with an amino alcohol having a boiling point of at least 175° C. A catalyst is not necessary and the procedure is simple and inexpensive. The necessity of running or depolymerizing the fossil resin to obtain a reaction is obviated. By my process, new amides and esters are produced which were not heretofore available.

While I have described certain preferred embodiments of my invention, it will be understood my invention is not limited thereto, since it may be otherwise embodied within the scope of the following claims.

I claim:

1. In a process for the manufacture of amides of fossil resins, the step which comprises heating fossil resins in normal condition with a polyethylene amine containing at least two ethylene groups, for a sufficient period of time at a temperature sufficiently high to cause amide formation without material distillation of the unreacted polyethylene amine during the process of reaction.

2. In a process for the manufacture of derivatives of copal resins, the step which comprises reacting under reflex copal resin in normal condition with triethylene tetramine for a sufficient period of time at a temperature sufficiently high to cause amide formation without material distillation of the unreacted triethylene tetramine during the process of reaction.

3. In a process for the manufacture of derivatives of copal resin, the step which comprises reacting under reflux copal resin in normal condition with diethylene triamine for a sufficient period of time at a temperature sufficiently great to cause amide formation without material distillation of the unreacted diethylene triamine during the process of reaction.

4. As a new article of manufacture, an amide of a fossil resin prepared by the process of claim 1.

KARL H. WEBER.